April 6, 1965 F. G. BENHAM 3,177,021
KNOT TYING DEVICE
Filed Sept. 18, 1962
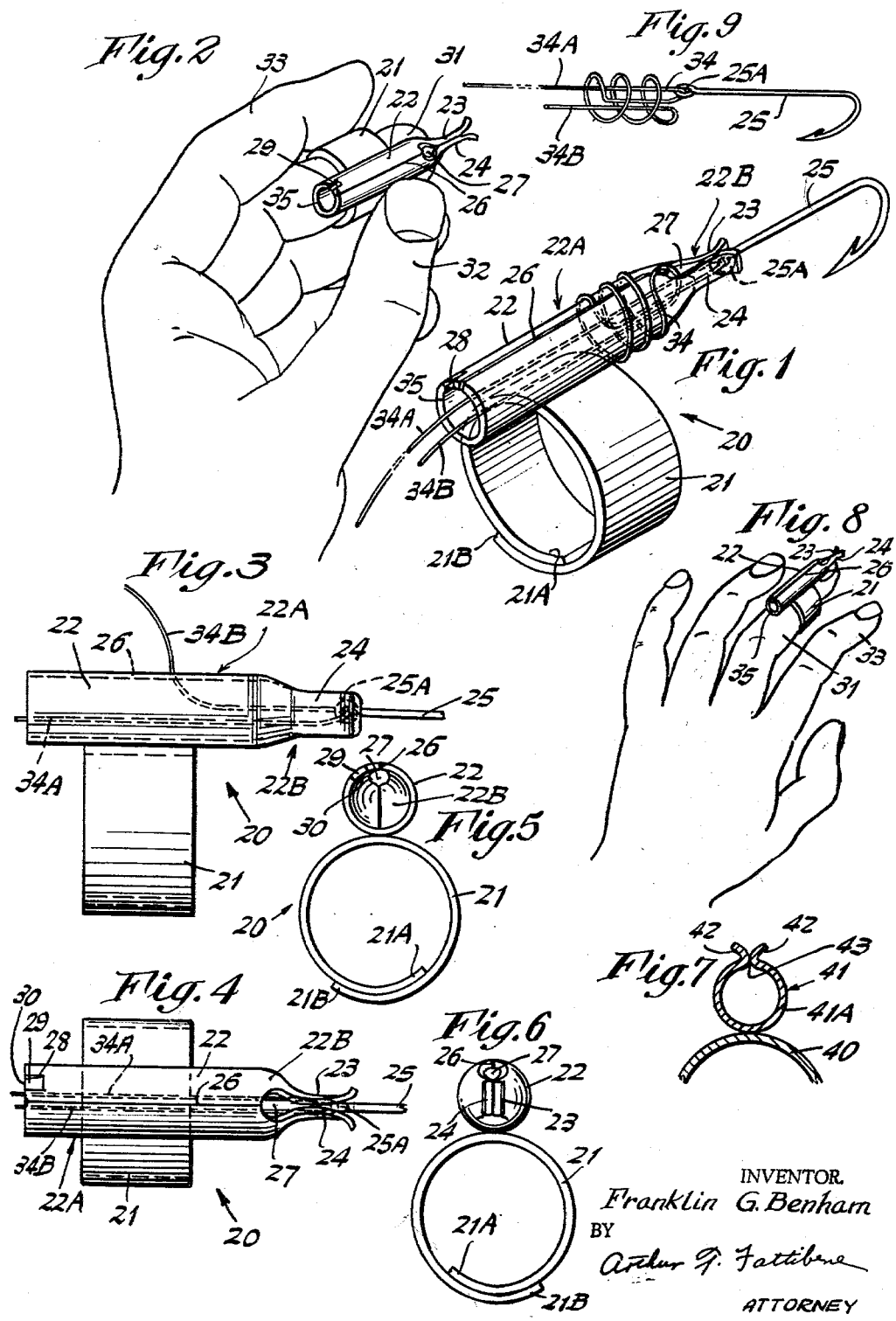
INVENTOR.
Franklin G. Benham
BY
Arthur G. Fattibene
ATTORNEY United States Patent Office 3,177,021
Patented Apr. 6, 1965

3,177,021
KNOT TYING DEVICE
Franklin G. Benham, Stratford, Conn.
(Pepper St., Stepney, Conn.)
Filed Sept. 18, 1962, Ser. No. 224,485
1 Claim. (Cl. 289—17)

This invention relates in general to a knot tying device or aid, and more specifically to a knot tying device for facilitating the tying of a knot in a monofilament line, or the like, commonly used by fishermen.

Tying knots by hand in a monofilament line used for fishing constitutes a relatively difficult task. For this reason numerous types of knot tying devices and aids have been proposed and used to facilitate the tying of such knots. However, the known devices have proved inconvenient to use in that they are generally complicated and difficult to manipulate. Also the known devices when not in use had to be stored or carried either in a tackle box or in one's pocket. Therefore, every time a fisherman required the use of such knot tying device, he would have to search his tackle box, pockets, or surrounding area to locate the device. This hunting for such knot tying device each time its use was required proved to be a serious inconvenience to sportsmen in that much valuable time was lost in looking for the device. This inconvenience of hunting for the knot tying device is rendered even more aggravating when the fish are bitting. In his haste the fisherman would oftentimes overlook or even forget where he last placed the knot tying device. As a result his fishing enjoyment would be greatly diminished. Frequently, the knot tying devices of the prior known constructions would be come completely lost or misplaced after they had been once placed in use. Also the known constructions were relatively complicated in structure and operation. For this reason they are relatively expensive to fabricate, and difficult and cumbersome to use.

An object of this invention is to provide a novel knot tying device constructed and arranged so as to eliminate any possibility of losing or misplacing the same once it has been placed in use.

Another object is to provide a knot tying device that is relatively simple in structure, relatively inexpensive to fabricate, and very easy to use.

Still another object is to provide a knot tying device which may be worn as a ring on one's finger whether in use or not.

The foregoing objects, and other features and advantages of this invention are attained by a knot tying device comprising essentially an expandible band or ring adapted to be worn on one's finger and having connected thereto a tubular member having a nose portion constructed with gripping means for frictionally retaining thereon an article, e.g., the eye of a fish hook, to which a line is to be tied. The tubular member is provided with a longitudinally extending slit through which both ends of the line threaded through the eye or hole in the article may be inserted. Accordingly to form the knot, the short end of the line is partially withdrawn from the tubular member through the slit and thereafter looped or coiled several times about the circumference of the tubular member. The tubular member is also provided with an aperture disposed along the slit and ahead of the coiled line through which the free end of the line defining the wound loops is inserted into the tubular member to form the knot. Both ends of the line are then withdrawn from the tubular member by passing the same through the slit. The wound loops are then slipped off the tubular member. The knot thus formed is then pulled tight onto the article. Also means are provided to define a cutting edge whereby the line can be easily cut or severed, if desired.

A feature of this invention resides in the provision that the knot tying device may be worn as a ring on the user's finger and rendered readily rotatable thereon whereby the device is disposed on the palm side of the hand in the operative position thereof, and on the back side of the hand and out of the way in the inoperative position thereof.

Another feature resides in the provision wherein the ring portion is readily expandible to fit any size finger.

Still another feature resides in that the knot tying device is very simple to use and very positive in operation, and that it insures the tying of a slip-proof knot.

Still another feature resides in the provision of a cutting means to facilitate the cutting of the line, if desired.

Other features and advantages will become more readily apparent when considered in view of the description and drawings in which:

FIG. 1 illustrates a perspective view of the knot tying device of this invention.

FIG. 2 illustrates the knot tying device of FIG. 1 as worn on one's finger when in operative knot tying position thereof.

FIG. 3 is a side elevation view of the device of FIG. 1.

FIG. 4 is a plan view of the device of FIG. 1.

FIG. 5 is an end view of the device of FIG. 1 looking in the direction of line 5—5 of FIG. 3.

FIG. 6 is a front end view of FIG. 4.

FIG. 7 is a section view of a slightly modified form of the invention.

FIG. 8 illustrates the wearing of the device of FIG. 4 in the inoperative, out of the way position.

FIG. 9 illustrates the detail windings of the slip proof knot formed with the knot tying device of this invention.

Referring to the drawings, there is shown in FIG. 1 the knot tying device 20 of this invention. It comprises essentially a finger embracing means or ring 21 and a tubular member 22 connected to the outer circumference or surface of the ring 21. As shown, ring 21 is formed of a band of suitable material, e.g., a resilient plastic or metallic material constructed so as to accommodate fingers of varying sizes. It will be noted that the ring or band 21 should fit one's finger so that it may be readily rotated thereon. In the illustrated embodiment, the ends 21A, 21B of the band 21 defining the ring overlap a given arcuate portion of the ring. Thus it will be noted that the ring is rendered readily expandible permitting the ring to be adjusted for size.

The tubular member 22 connected to the ring is preferably made of the same material as that of the ring 21. For ease of manufacture and reasons of economy it may be preferred that the device 20 be made wholly of suitable plastic material. The device 20 may also be readily made entirely of metal. In either event, the tubular member 22 is illustrated as an elongated member of substantially circular cross-section having a main body portion 22A tapering at one end to define a nose portion 22B of reduced cross-section.

As best seeen in FIGS. 1 and 4 the nose portion 22B is bifurcated to define a pair of resilient jaws 23 and 24. The jaws 23, 24 are constructed so that they are normally biased closed, and the tip ends thereof are flared outwardly to facilitate insertion therebetween of a fish hook, or the like. Preferably the jaws 23, 24 are disposed on opposite sides of the center line of tubular member 22.

In accordance with this invention the main body portion 22A of the tubular member 22 is provided with a co-extensive, longitudinally extending slit 26 which extends through the thickness of the member 22 and which joins with the bifurcating line of the nose portion to define a slit extending the length of the tubular member. Member 22 is also provided with an enlarged opening 27 in the nose portion 22B rearwardly of the jaws 23, 24.

Opening 27 connects with the slit 26 and the bifurcation of the jaws. It will be noted that the ends of the slit 26 are disposed contiguous to each other, and they can be readily parted to permit the line to pass therethrough with little effort.

The rear end of the body 22A is notched out at 28, and a cutting tool 29 having a sharp cutting edge 30 is embedded therein.

With the structure of the knot tying device thus described, the operation thereof is as follows.

In operation, the knot tying device or aid 20 described is worn as a ring. In the inoperative position, the device 20 is worn so that the tubular member 22, connected to the ring 21, is disposed on the back side of the hand and out of the way, as seen in FIG. 8. In operative position, the ring 21 is rotated 180° so that the tubular member 22 is disposed on the palm side of the hand, as shown in FIG. 2. The device 20 in operative position is preferably worn on the middle finger 31 adjacent the first joint so that the tubular member 22 can be manipulated between the thumb 32 and forefinger 33.

To tie a knot in a monofilament line for securing a fish hook 25 thereto with the aid of the instant device, the line 34 is first threaded through the eye 25A of a hook to define a loop having a long end 34A and a short end 34B. The eye 25A of the hook 25 with the line 34 threaded thereto is then positioned between the jaws 23, 24 and frictionally retained therebetween. The double ends 34A, 34B of the line 34 is then inserted or passed through the slit 26 of the tubular member 22 to assume the position as shown in FIG. 4. In this position both ends 34A, 34B of the line 34 extend out through the open rear end 35 of the main body portion 22A. The short end 34B of line 34 is then withdrawn part way out through slit 26, as shown in FIG. 3. The short end 34B of line 34 is then looped or coiled about the main body 22A portion of the tubular member 22 to the rear of opening 27, as seen in FIG. 1. The short end 34B of the line 34 may be wound with two, three or more convolutions about the body portion 22A. After the desired number of convolutions have been formed about body 22A, the free end of the short end 34B is inserted through the opening 27 and passed through the length of body 22A so that the free end of 34B extends out the rear end of the body 22A, as seen in FIG. 1. The two ends 34A and 34B of the line 34 are then withdrawn from the body 22A through the slit 26, the hook 25 removed, and the windings or coils of line 34 on body 22A slipped off the nose portion 22B of the device. The knot formed is then pulled tight onto the eye 25A of the hook 25 by holding the two ends 34A, 34B of the line 36 and pulling on the hook 25.

FIG. 9 illustrates the detail windings of the line forming the knot tied by the device. The knot formed is a series of half hitches. It is a slip-proof knot and will not untie.

If the short end 34B of the knot is made too long, the excess portion thereof may be readily cut by the cutting tool 29 provided in the rear end of the device 20.

FIG. 7 illustrates a slightly modified form of the invention. This form comprises a ring portion 40 and a tubular member 41, both of which are similar in every respect to the device 20, as herein described, except that the main body portion 41A is provided with longitudinally extending, outwardly flared wing portions 42 co-extensive the length of slit 43. Thus, as shown, the flared wing portions 42 define a guide or mouth to facilitate the passing of the line in and out of the slit during a knot tying operation as hereinbefore described.

From the foregoing description, it will be readily apparent that the knot tying device of this invention is relatively simple in construction and easy to use. It can be worn on one's hand throughout the entire fishing period. The fisherman need not waste time looking for the device, each time he is required to use the same. He knows it will be on his finger. When not in use, the device can be readily rotated so as to dispose the tubular portion thereof on the back side of the hand and out of the way. In use, it is rotated to the palm side of the hand, and disposed in position whereby it can be readily grasped by the thumb and index finger and be manipulated accordingly. The device 20 is sturdy, yet light in weight, convenient and positive in operation.

While the instant invention has been disclosed with reference to a particular embodiment, it is to be appreciated that the invention is not to be taken as limited to all of the details thereof as modifications and variations thereof may be made without departing from the spirit or scope of the invention.

What is claimed is:

A knot tying aid comprising:
(a) an expandable ring adapted to be worn on one's finger so as to be rotatable thereon whereby said aid is disposed on the palm side of said hand in the operative position and on the back side of said hand in the inoperative position,
(b) an elongated tubular member connected to the outer surface of said ring so as to extend normal to the ring and along the length of the finger on which said ring is worn,
(c) said elongated tubular member including a main body portion, and
(d) a projecting nose portion forming an integral extension of said body portion,
(e) said nose portion being of a reduced cross-section with respect to that of said main body portion,
(f) said tubular member having a slit extending through the wall portion of said member and said slit extending longitudinally thereof and substantially co-extensive with the length of said member,
(g) the ends of said member defining said slit being disposed in contiguous relationship,
(h) said tubular member having an opening located on said slit adjacent said nose portion,
(i) and said slit partitioning said nose portion to define a pair of resilient jaw members whereby a hook having a line threaded through the eye thereof to define a loop having a long and a short end is disposed between the said jaw members to be retained thereby so that the ends of the loop so formed are disposed within said tubular member and the knot formed by withdrawing the short end of the loop partly through said slit and the withdrawn portion of said short end being coiled about said tubular member between said withdrawn portion and said opening, the free end of the short end then being inserted through said opening to extend out the rear of said tubular member whereby the respective ends of the loop can then be withdrawn from said tubular member through said slit to remove the coils off the body.

References Cited by the Examiner

UNITED STATES PATENTS 1,486,070  3/24  Boedker _____ 289—17
2,697,624  12/54  Thomas et al. _____ 289—17

DONALD W. PARKER, *Primary Examiner.*

RUSSELL C. MADER, *Examiner.*